United States Patent [19]
Schilling et al.

[11] 3,928,901
[45] Dec. 30, 1975

[54] FORMING A CLADDING SHEET TO A CONVEX/CONCAVE SUBSTRATE

[75] Inventors: William F. Schilling, Schenectady; Adrian M. Beltran, Ballston Lake, both of N.Y.

[73] Assignee: General Electric Company, Schenectady, N.Y.

[22] Filed: Oct. 10, 1974

[21] Appl. No.: 513,852

[52] U.S. Cl. .................. 29/156.8 B; 29/505; 72/56
[51] Int. Cl.² ...................... B23P 15/04; B21K 3/04
[58] Field of Search ......... 29/156.8 B, 156.8 P, 448, 29/449, 421, 475, 480, 505, 515, 516; 72/56, 60; 264/88, 229, 241, 259, 263, 292; 416/229, 241; 156/198

[56] References Cited
UNITED STATES PATENTS

| | | | |
|---|---|---|---|
| 3,433,039 | 3/1969 | Henriksen | 72/56 |
| 3,668,768 | 6/1972 | Decore et al. | 72/56 |
| 3,699,623 | 10/1972 | Kreider | 29/156.8 B |
| 3,699,642 | 10/1972 | Lange | 29/156.8 B X |
| 3,707,750 | 1/1973 | Klass | 29/156.8 B |
| 3,827,118 | 8/1974 | Appel | 29/156.8 B |

*Primary Examiner*—C. W. Lanham
*Assistant Examiner*—Joseph A. Walkowski
*Attorney, Agent, or Firm*—John F. Ahern; James W. Mitchell

[57] ABSTRACT

A sheet cladding is closely preformed to a convex-concave substrate by a method including the steps of rough forming the sheet cladding about the substrate so that the sheet cladding closely abuts the convex surface of the substrate while being spaced from the concave surface of the substrate. The sheet cladding, assembled to the substrate, is placed into a rubbery mold which is thereafter sealed and cold isostatic pressure is applied thereto so that the portion of the cladding sheet opposite the concave surface is deformed into the concave surface thereby stretching the sheet cladding to form a tight skin over the substrate.

6 Claims, 4 Drawing Figures

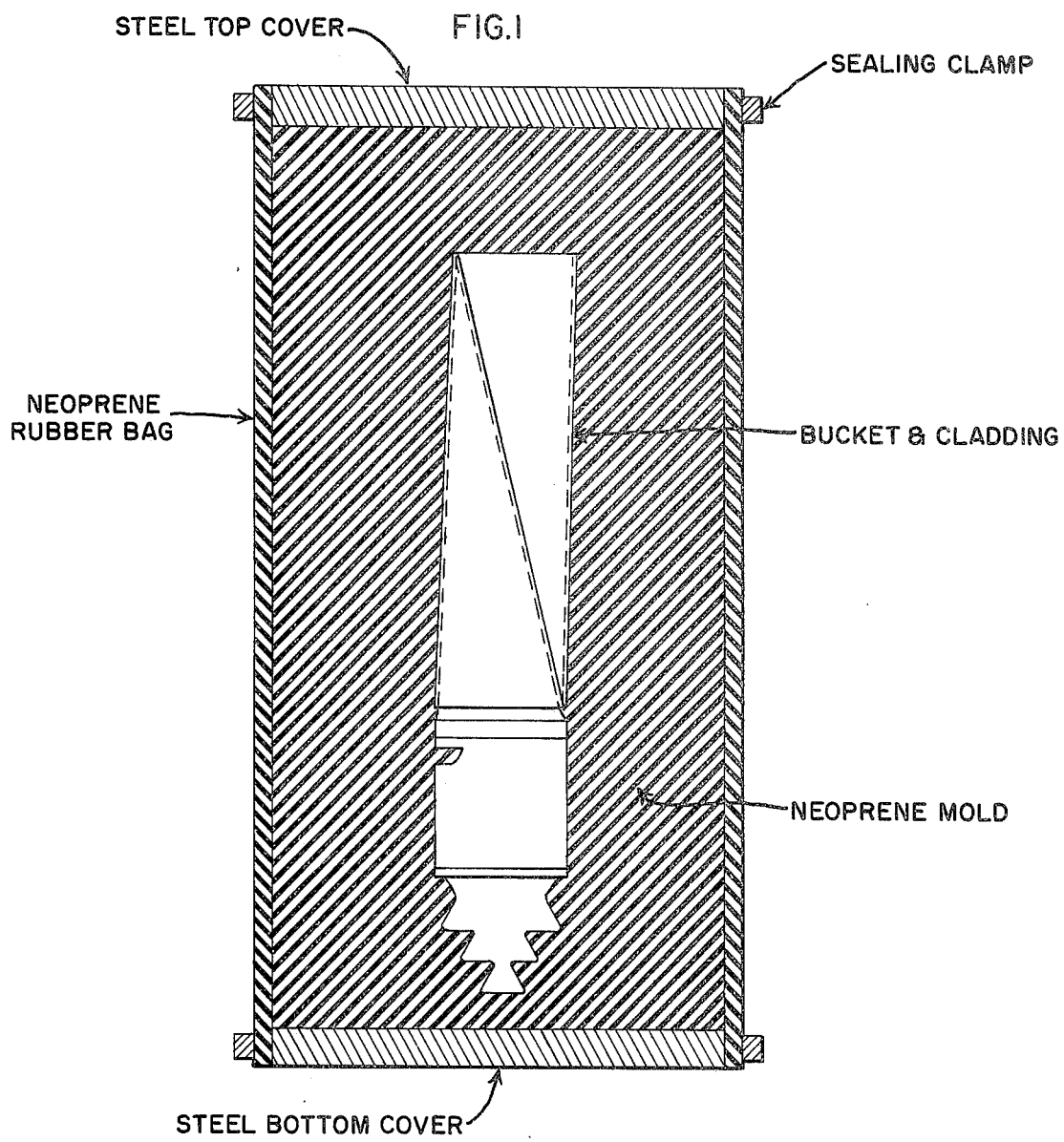

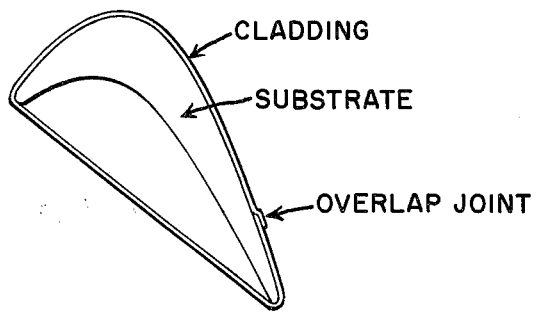
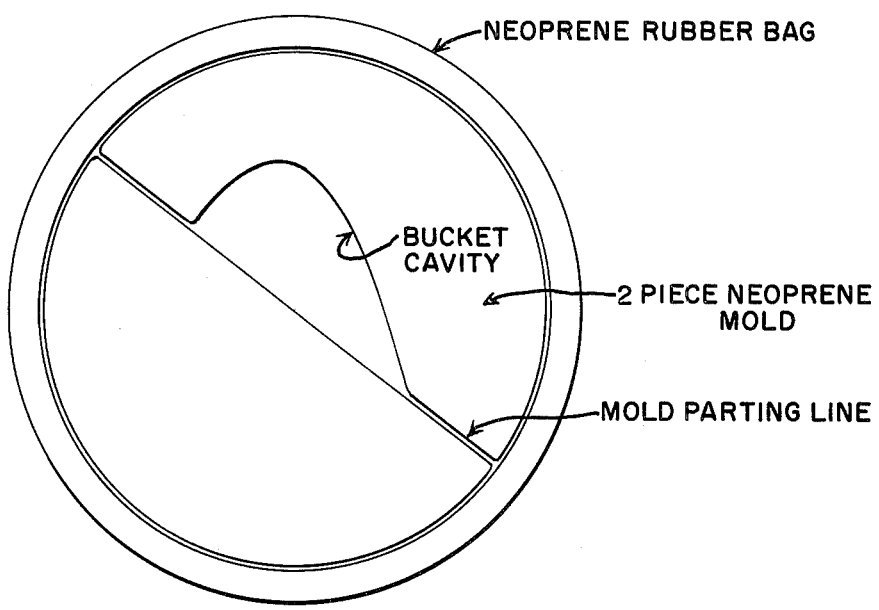
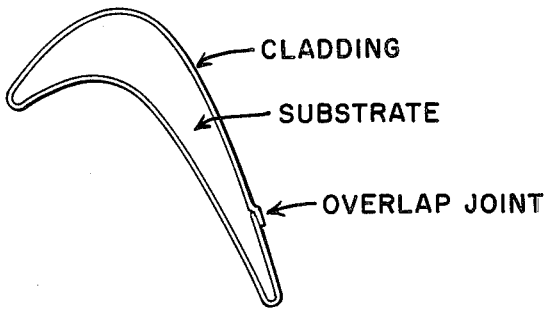

FORMING A CLADDING SHEET TO A CONVEX/CONCAVE SUBSTRATE

BACKGROUND OF THE INVENTION

This invention relates, in general, to forming a sheet cladding about a concave-convex substrate. In particular, this invention relates to turbo-machine buckets, blades and airfoils and a method of preforming a protective sheet cladding thereto.

The surface stability of superalloys looms as a significant problem for advanced industrial and aircraft gas turbines. Highly corrosive environments are generated by the combustion of heavy fuel oils; and, when this is coupled with higher firing temperatures and longer maintenance intervals, some very strict limitations arise in materials selection. The application of an oxidation and hot corrosion-resistant sheet cladding alloy to a high-strength bucket substrate represents one solution to the surface stability problem.

U.S. patent application Ser. No. 513,853 assigned to the assignee of the present invention for "Method of Bonding a Sheet Cladding to a Concave-Convex Substrate" filed Oct. 10, 1974 in the names of Beltran and Dybas discloses a method of diffusion bonding a sheet cladding to a concave-convex substrate. In that method, prior to vacuum brazing and diffusion bonding the sheet cladding is preformed to the substrate. If the concave-convex substrate is a turbine bucket, each bucket is likely to have a slightly different configuration making a conventional forming operation nearly impossible. Hand-forming the sheet cladding to the substrate may not provide the requisite accuracy necessary to provide a smooth sheet cladding over the substrate since excess sheet cladding may tend to form wrinkles and other defects. Other mechanical metal-forming techniques such as forging, roll bonding and swaging are not readily amenable to the fabrication of complex geometric shapes to the accuracy required in the aforementioned diffusion bonding processing of sheet claddings. The method of the present invention provides the necessary accuracy for preforming a sheet cladding to a convex-concave substrate in preparation for bonding the sheet cladding to the substrate. The application of isostatic pressure has enough built-in flexibility to compensate for part to part dimensional variations. Moreover, the usefulness of the present invention is not limited to the method of the aforementioned patent application and may be applied as a preliminary step to any bonding method where it is required to preform the sheet cladding to a convex-concave substrate, e.g., U.S. Pat. No. 3,699,642 issued Oct. 24, 1972 to Lange.

The application of cold isostatic pressure is a known process in the art of compaction and densifying of metal and oxide powders and there are commercially available devices for applying the cold isostatic pressure. However, the use of cold isostatic pressure for conforming a sheet cladding to a convex-concave substrate in the method hereinafter described is believed to be unique.

Isostatic pressure, which is equal in all directions, imparts uniform pressure to the sheet cladding. Other known prior art processes rely on uni- or bi-axial pressure which may cause tearing of the sheet cladding. The use of isostatic pressure is important since more corrosion-resistant sheet cladding alloys have limited ductility (formability) and therefore are more prone to tearing failure in the forming operation.

It is one object of the present invention to provide an accurate method of preforming a sheet cladding to a convex-concave substrate.

It is another object of the invention to provide a method of accurately preforming a sheet cladding to a concave-convex substrate prior to bonding the cladding to the substrate in order to lessen the occurrence of defects in the sheet cladding.

The method of the present invention is carried out by rough forming an annealed and pre-cut sheet cladding to a convex-concave substrate so that the sheet cladding closely abuts the convex surface of the substrate while the sheet cladding is spaced from the concave surface of the substrate. The sheet cladding is spot-welded, at one edge, at the convex surface of the substrate; then the cladding is wrapped about the substrate and the other edge of the sheet cladding is welded to the one edge to form a longitudinal seam on the convex surface. The assembled sheet cladding and substrate is inserted into a rubbery mold and are thereafter sealed in a rubbery sleeve. Application of cold isostatic pressure to the assembly causes the heretofore undeformed portion of the sheet cladding, spaced from the concave surface, to deform into the concave surface thereby stretching the cladding sheet around the substrate to form a close-fitting outer skin.

The novel features believed characteristic of the present invention are set forth in the appended claims. The invention itself, however, together with further objects and advantages thereof, may best be understood with reference to the following description, taken in connection with the appended drawings.

BRIEF DESCRIPTION OF THE DRAWINGS

FIG. 1 is an elevation view of a clad convex-concave substrate inserted in a rubbery mold and sleeve, the latter which is shown in cross section. The dotted line represents the substrate and the diagonal dotted and solid lines represent the curvature of the substrate and clad respectively.

FIG. 2 is a plan view of the cladding sheet and substrate after the step of rough forming the cladding sheet to the substrate.

FIG. 3 is a plan view of the rubbery sleeve and mold without the clad-substrate therein; and, FIG. 4 is a plan view of the cladding sheet and substrate after the steps of the present invention are carried out.

DETAILED DESCRIPTION OF THE INVENTION

The method of the present invention is directed to preforming a sheet cladding to a substrate having convex-concave surfaces. An example of such a substrate is found in turbo-machine buckets, blades and airfoils. The purpose of the sheet cladding is to protect the substrate which may be a high-strength alloy having poor corrosion-resistant qualities. The sheet cladding must be accurately preformed to the bucket prior to diffusion bonding to ensure an accurate defect-free outer surface.

The present method contemplates annealing and cleaning the sheet cladding material to achieve maximum ductility and surface cleanliness prior to applying the cladding to the substrate. The substrate is pre-cleaned since the cladding is formed on the bucket and therefore need not be removed after forming. In addition, no lubricants are used and therefore necessary surface cleanliness for later processing is maintained. After annealing, a blank is cut from the sheet cladding material. The blank shape is such that it approximates the unfolded outer surface of the substrate. In the case of an airfoil, the blank may not completely match the unfolded surface since the airfoil surface is not "ruled", i.e., when unfolded, the surface will not lie in a single plane.

After cutting, the blank is rough formed on an actual substrate as shown in FIG. 2. One preferred method comprises the steps of spot-welding one edge of the blank to the convex side of the substrate and wrapping the blank around the substrate and thereafter joining the other edge of the blank to the one edge to form an overlapping joint or seam on the convex surface of the substrate. In the case where the substrate is an airfoil, the leading and trailing edges are sharply defined in the cladding blank as it is wrapped. Alternatively, a butt joint may be formed where both edges of the blank are fastened to the convex substrate side. Another alternative is to pre-weld the edges of the blank together and form a cylinder which is then slid over the substrate in which case the blank edges are welded to themselves. Any seam which is formed is preferably on the convex side of the substrate since this is the area of minimal stress and service abuse and furthermore, the location of least deformation during cold isostatic pressing according to the present method so the possibility of tearing failure of the cladding blank is minimized. Also, it should be noted that any convenient method of joining the blank edges may be employed such as brazing as an alternative to spot welding. Referring to FIG. 2, the cladding blank will closely abut the substrate convex surface and furthermore the joining seam will also abut thereto. The portion of the cladding blank opposite the concave surface is spaced from the concave surface for reasons which will become apparent.

The assembled sheet cladding blank and substrate are then inserted into a split rubbery mold (FIGS. 1 and 3). The mold may be formed of neoprene rubber and has an interior surface which nearly matches the actual substrate with the exception that additional space has been provided at the concave surface for the presence of the undeformed sheet cladding.

As shown in FIG. 1, the mold with the clad substrate in place is inserted into a rubbery sleeve or bag (neoprene rubber) and steel top and bottom plates are clamped to each end of the sleeve to provide a leak-tight condition with hose-clamp fixtures. The purpose of the sealing is to prevent leakage of the cold isostatic pressurizing media (an oil and water emulsion) into the mold and thereby establish a pressure differential whereas the rubber mold prevents tearing of the rubber sleeve due to substrate-clad sharp edges. However, the mold itself is porous enough to accept air from between the blank and substrate as pressure is applied.

The sealed sleeve (bag) is then placed in a cold isostatic pressing unit and the unit is pressurized. The isostatic pressure exceeds the room temperature yield strength of the blank cladding based on the thickness of the cladding multiplied by the height (from bucket root to tip) of the concave surface to be clad. Cold isostatic pressing units are available from Autoclave Engineers Corporation. During the pressurizing operation, the sheet cladding which is present opposite the concave surface is pushed or deformed into contact with the concave surface of the substrate (FIG. 4). The convex side of the clad substrate undergoes minimal change since there is little opportunity for movement. After a suitable time the cold isostatic pressing unit is depressurized and the cladding substrate assembly may then be processed for diffusion bonding or other known bonding processes. It is possible to substitute hot isostatic pressing for cold isostatic pressing but application of heat would not be beneficial and moreover could affect the mold material.

For purposes of an airfoil, the overlapping seam may be later machined away (after diffusion bonding) to provide a smooth convex surface.

EXAMPLE

A blank of 0.01 inch thick Ni-50 Cr (Inconel Alloy 671) 4 inches wide by about 6 inches long in the as-rolled condition (about 20% cold work) was annealed at 2300°F for 30 minutes in dry hydrogen. The substrate was an airfoil and the blank was cut from the sheet cladding to resemble the unfolded outer surface of the airfoil allowing for 10 to 15% elongation. The blank was lightly abraded and then washed with isopropyl alcohol as a final cleaning step. The airfoil surface had been chemically etched, nickel plated (thickness~0.0005 inch) and given a vacuum diffusion treatment at 2250°F for 1 hour to ensure good adhesion of the plated layer. The blank was then hand-formed about the airfoil and the leading and trailing edges were sharply defined. The cladding seam was located on the convex side about 1 inch from the trailing edge. The cladding was spot-welded to the airfoil surface and an overlap seam established by overlapping the remaining cladding edge over the spot-welded edge and spot-welding it in place. The clad/airfoil assembly was then placed in a split neoprene mold and sealed in a neoprene bag. The assembly was then placed in a cold isostatic pressure unit; and, the unit was sealed and pressurized to 14 KSI hydrostatic pressure using a water/oil emulsion as the pressurizing media. As soon as the 14 KSI pressure was reached, the unit was depressurized for a total cycle time of about two minutes. The clad/airfoil assembly was removed from the unit and the rubber mold stripped away.

In addition, it has been found that the minimum isostatic pressure necessary is the room temperature yield stress of the cladding alloy, multiplied by the clad thickness, multiplied by the height of the concave surface from bucket root to tip. Pressures as low as 4 KSI have been used in the method.

Other examples of alloys that are useful as sheet cladding are Hastelloy X, FeCrAlY (2541), HS 188, and 304 stainless steel.

Cladding blank length varies from one cladding alloy to another. The main reason for this is that alloy ductility varies and hence the amount of material (length of sheet) which is located adjacent the concave surface, the area where nearly all the strain (deformation) occurs, determines the amount of deformation the sheet alloy will experience. In general, it is desirable to incorporate a maximum amount of deformation during CIP forming since leading and trailing edge detail will improve with increasing strain.

Other types of materials are possible for use as molds such as buena-N rubber and polyurethane.

While there is described what is considered, at present, to be the preferred embodiment of the invention, it is, of course, understood that various other modifications may be made therein. It is intended to claim all such modifications as fall within the true spirit and scope of the present invention.

What is claimed is:

1. A method of preforming a sheet cladding to a substrate having a concave-convex surface, the method comprising the steps of:
    a. rough forming the sheet cladding to the substrate so that the sheet cladding closely abuts the convex surface of the substrate while the sheet cladding opposite the concave surface of the substrate is spaced from the concave surface including:
        i. fastening one edge of the sheet cladding to the convex surface of the substrate;
        ii. joining the other edge of the sheet cladding to the one edge of the sheet cladding to define a seam on the convex surface of the substrate;

2. The method recited in claim 1 further comprising the steps of:
    a. annealing the sheet cladding; and,
    b. cutting the sheet cladding into a blank to approximate the unfolded outer surface of the substrate prior to the rough farming step.

3. A method of preforming a sheet cladding to a substrate having a convex-concave surface, the method comprising the steps of:
    a. rough forming the sheet cladding to the substrate so that the sheet cladding closely abuts the convex surface of the substrate while the sheet cladding opposite the concave surface of the substrate is spaced from the concave surface;
    b. placing the sheet cladding and substrate assembly into a sealed rubbery mold including:
        i. inserting the rubbery mold into a rubbery sleeve;
        ii. sealing each end of the rubbery sleeve with an end plate and clamp; and,
    c. applying isostatic pressure to the mold to deform the sheet cladding into contact with the substrate concave surface.

4. The method recited in claim 3 wherein the rough forming step further comprises joining one edge of the sheet cladding to the other edge at the convex surface of the substrate.

5. The method recited in claim 3 wherein the isostatic pressure is cold isostatic pressure exceeding the room temperature yield strength of the sheet cladding based on the thickness of the cladding multiplied by the height of the concave surface to be clad.

6. A method of forming a sheet cladding to an airfoil substrate having a concave-convex surface, the method comprising the steps of:
    a. rough forming the sheet cladding to the substrate so that the sheet cladding closely abuts the concave surface including:
        i. fastening one edge of the sheet cladding to the convex surface of the substrate;
        ii. joining the other edge of the sheet cladding to the one edge of the sheet cladding to define a seam on the convex surface of the substrate;
    b. placing the sheet cladding and substrate assembly into a sealed rubbery mold; and,
    c. applying isostatic pressure to the mold and assembly to deform the sheet cladding to the substrate concave surface wherein the isostatic pressure exceeds the room temperature yield strength of the sheet cladding based on the thickness of the cladding sheet multiplied by the height of the concave surface to be clad.

* * * * *